United States Patent
Fazzio

(10) Patent No.: US 9,463,344 B2
(45) Date of Patent: Oct. 11, 2016

(54) BELLOWS ACTUATED TEMPERATURE COMPENSATED PRESSURE SWITCHING APPARATUS AND SYSTEM

(71) Applicant: KIDDE TECHNOLOGIES, INC., Wilson, NC (US)

(72) Inventor: Mark Fazzio, Wilson, NC (US)

(73) Assignee: Kidde Technologies, Inc., Wilson, NC (US)

(*) Notice: Subject to any disclaimer, the term of this patent is extended or adjusted under 35 U.S.C. 154(b) by 255 days.

(21) Appl. No.: 14/264,948

(22) Filed: Apr. 29, 2014

(65) Prior Publication Data

US 2015/0306439 A1 Oct. 29, 2015

(51) Int. Cl.

| | |
|---|---|
| *A62C 35/02* | (2006.01) |
| *A62C 37/50* | (2006.01) |
| *A62C 3/08* | (2006.01) |
| *A62C 13/76* | (2006.01) |
| *A62C 3/00* | (2006.01) |
| *A62C 35/00* | (2006.01) |
| *G01L 7/06* | (2006.01) |
| *G01L 9/14* | (2006.01) |
| *G01L 19/04* | (2006.01) |
| *G01L 9/00* | (2006.01) |

(52) U.S. Cl.
CPC ............. *A62C 37/50* (2013.01); *A62C 3/006* (2013.01); *A62C 3/08* (2013.01); *A62C 13/76* (2013.01); *A62C 35/00* (2013.01); *G01L 7/06* (2013.01); *G01L 9/0033* (2013.01); *G01L 9/14* (2013.01); *G01L 19/04* (2013.01)

(58) Field of Classification Search
CPC ........ A62C 37/50; A62C 3/08; A62C 13/76; A62C 3/006; A62C 35/00; G01L 7/06; G01L 19/04; G01L 9/0033; G01L 9/14

USPC ......... 169/23, 26, 65, 75; 73/708, 715, 717, 73/729.1

See application file for complete search history.

(56) References Cited

U.S. PATENT DOCUMENTS

| | | | | |
|---|---|---|---|---|
| 2,497,286 | A * | 2/1950 | Ashcraft | A62C 35/605 169/26 |
| 3,461,725 | A * | 8/1969 | Melville | G01L 9/0036 73/729.1 |
| 3,776,313 | A * | 12/1973 | DePalma | A62C 35/10 169/26 |
| 3,946,175 | A | 3/1976 | Sitabkhan | |
| 4,655,087 | A | 4/1987 | Rozniecki | |
| 4,697,643 | A * | 10/1987 | Sassier | A62C 37/00 169/75 |

FOREIGN PATENT DOCUMENTS

WO 9300961 1/1993

OTHER PUBLICATIONS

Extended European Search Report dated Oct. 6, 2015 in European Application No. 151653185.

* cited by examiner

*Primary Examiner* — Steven J Ganey
(74) *Attorney, Agent, or Firm* — Snell & Wilmer, L.L.P.

(57) ABSTRACT

In various embodiments, a fire suppression system with integral leak detection is provided. The fire suppression system may comprise a bottle, a pressure monitoring system, and a controller. The pressure monitoring system may include a bellows. The bellows may be in fluid communication with the volume defined by the bottle. The controller may be configured to monitor the bellows.

15 Claims, 2 Drawing Sheets

BELLOWS ACTUATED TEMPERATURE COMPENSATED PRESSURE SWITCHING APPARATUS AND SYSTEM

FIELD

The present disclosure relates to leak detection system for vehicle fire suppression systems, and more specifically, to bellows actuated temperature compensated leak detection systems.

BACKGROUND

Current temperature compensated pressure switches ("TCPS") used in aircraft fire suppression containers may use thin diaphragms, which may deform based on the pressure balance between a fire suppression container and a reference chamber within the TCPS. If the container pressure exceeds the reference chamber pressure, the diaphragm may act on a plunger, which may actuate a micro-switch. Current TCPS may be inefficient and expensive to manufacture.

SUMMARY

In various embodiments, a fire suppression system may comprise a bottle, a pressure monitoring system, and a controller. The pressure monitoring system may include a bellows. The bellows may be in fluid communication with the volume defined by the bottle. The controller may be configured to monitor the bellows.

In various embodiments, a pressure monitoring system may comprise a bellows and a reference chamber. The bellows may have a first surface and a second surface. The first surface may be configured to be loaded by a first pressure from a first suppression system. The reference chamber may be configured to maintain a reference pressure. The reference pressure may be configured to load the second surface.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
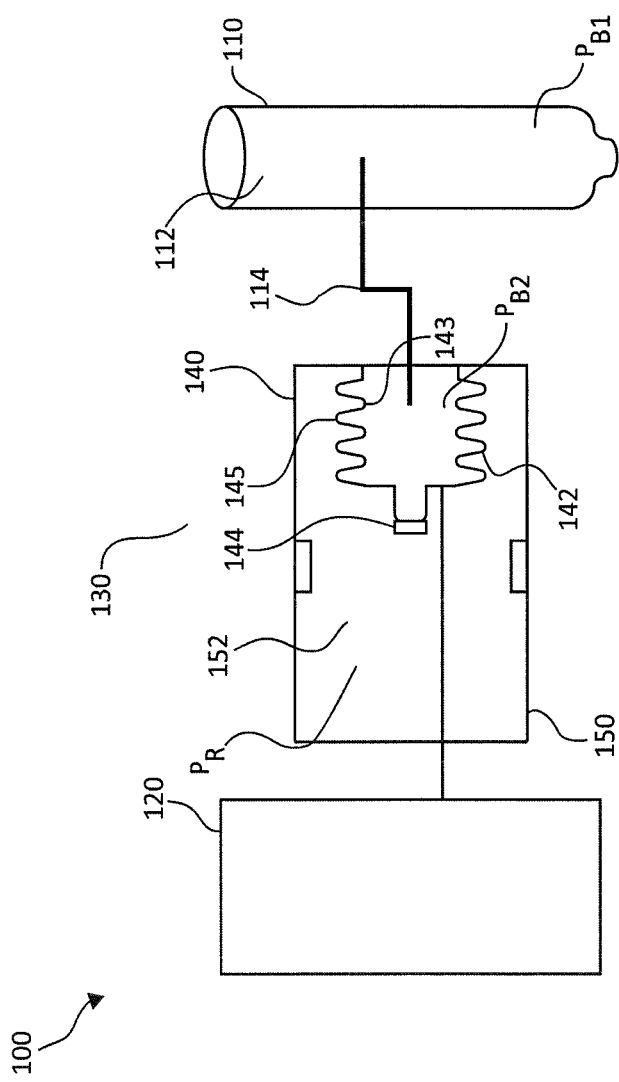
FIG. 1 is a schematic illustrating portions of a fire suppression system including a pressuring monitoring system comprising a bellows and a reference chamber, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

A typical ground checkable pressure switch design may use a stack of washers which are compressed by the pressure within a fire suppression container. In response to being compressed, an attached pin may make contact to a mating pin, thus identifying the container as being properly charged. If the fire suppression container loses pressure, the force balance changes and the pressure switch changes state to indicate a low pressure container.

In various embodiments, fire suppression systems for vehicles such as, for example, aircraft may include pressure indication systems. The fire suppression systems may include containers that are configured to store fire extinguishing agent without leakage. A pressure indication system may be configured to continuously monitor the container pressure. The container pressure may be evaluated against a reference chamber pressure. The reference chamber pressure may be a chamber that includes the same agent as the container. These pressure indication systems may be configured to indicate that a fire suppression system has sufficient level of pressure and/or fire suppression agent to extinguish and/or suppress a fire in response to the system being activated and/or fire being detected. These systems may include closed loop monitoring structures that allow a user to determine whether a fire suppression system is sufficiently pressurized and/or charged during operation of a vehicle. Moreover, the use of the bellows may reduce the number of parts and failure modes of the pressure indication system while providing a consistent actuation point.

In various embodiments and with reference to FIG. 1, fire suppression system 100 may be any suitable fire suppression, fire extinguishing, fire management, and/or fire control system that is capable of controlling, minimizing, suppressing and/or extinguishing a fire. Fire suppression system 100 may comprise a bottle 110 (e.g., a container, a canister, a pressure vessel, and/or the like), a controller 120, and a pressure monitoring system 130. Bottle 110 may be configured with and/or contain a fire suppression agent. The pressure $P_{B1}$ of the fire suppression agent contained in bottle 110 may be in fluid communication with pressure monitoring system 130. Pressure monitoring system 130 may be in electronic communication with controller 120. In this regard, controller 120 may be configured to monitor, track, report, and/or check pressure $P_{B1}$ and/or the fill level or quantity of the fire suppression agent contained within bottle 110.

Bottle 110 may be any suitable bottle configured to contain a fire suppression agent moreover bottle 110 may define a bottle volume 112. Bottle volume 112 may be configured to contain a fire suppression agent. Fire suppression agent may be contained within bottle volume 112 at a pressure $P_{B1}$. Moreover, bottle volume 112 may be operatively coupled to and/or in fluid communication with pressure monitoring system 130 via a connection 114.

In various embodiments, pressure monitoring system 130 may comprise a bellows 140 and a reference chamber 150. Bellows 140 may be removably coupled to and/or in removable contact with reference chamber 150.

In various embodiments, bellows 140 may comprise a body 142 having one or more interior convolutions 143 and one or more exterior convolutions 145. Body 142 may define a pressure chamber. The pressure chamber may be in fluid communication with bottle volume 112 via connection 114. In this regard, the pressure chamber and the interior convolutions 143 of body 142 may be subjected to a pressure $P_{B2}$. Pressure $P_{B2}$ may be substantially equivalent to and/or substantially equal to pressure $P_{B1}$ in bottle volume 112.

In various embodiments, reference chamber 150 may comprise a reference chamber volume 152. Reference chamber volume 152 may be pressurized to a pressure $P_R$. In this regard, pressure $P_R$ may be a reference pressure. Pressure $P_R$ may be equal to, slightly less than or slightly greater than at least one of pressure $P_{B1}$ and/or $P_{B2}$.

In various embodiments, bellows 140 may be a linear spring rate bellows. In this regard, interior convolutions 143 are open to the bottle volume 112 and the exterior convolutions 145 may be in fluid communication with reference chamber 150. In this regard, interior convolutions 143 may be acted on by $P_{B1}$ and/or $P_{B2}$ and the exterior convolutions may be acted on by $P_R$. Bellows 140 may also be inverted.

In various embodiments, pressure monitoring system 130 and/or bellows 140 may provide a hermetic seal between the bottle 110 and reference chamber 150. As the pressure $P_{B1}$ and/or $P_{B2}$ increases or decreases as compared to pressure $P_R$, bellows 140 may expand or contract, engaging or disengaging a mating contact 144 indicating a closed or open circuit. Upon disruption of the force balance across bellows 140, causing the bellows to expand or contract causing the circuit to open or close. The open versus closed circuit indicates a properly or improperly pressurized fire suppression container. In various embodiments and in operation, pressure $P_{B1}$ of the fire suppression agent in bottle 110 may be conducted to the pressure chamber of bellows 140 as $P_{B2}$ causing bellows 140 to expand, in response to pressure $P_{B2}$ being greater than pressure $P_R$. In this regard, pressure monitoring system 130 may be configured a closed circuit when pressure $P_{B2}$ is greater than pressure $P_R$. The closed circuit may be an indication that there is sufficient pressure and/or fire suppression agent in bottle volume 112. In response to a leak in bottle 110 and/or bottle volume 112, which may reduce pressure $P_{B1}$ and/or pressure $P_{B2}$, bellows 140 may be compressed by $P_R$ and indicating an open circuit. The open circuit may be an indication that bottle 110 and/or bottle volume 112 has leaked, that there is insufficient fire suppression agent in bottle 110, and/or there is insufficient pressure in bottle 110. Moreover, where pressure $P_R$ is greater than pressure $P_{B2}$, controller 120 may be configured to indicate that there is a problem with fire suppression system 100, bottle 110, and/or bottle volume 112.

In various embodiments, the configuration of bellows 140, body 142, reference chamber 150 and/or pressures $P_{B1}$, $P_{B2}$ and/or $P_R$ may be such that an open circuit indicates bottle 110 contains sufficient level and/or amount of pressure and/or fire suppression agent. Moreover, a closed circuit in this configuration may be an indication that bottle 110 and/or bottle volume 112 has leaked, that there is insufficient fire suppression agent in bottle 110, there is insufficient pressure in bottle 110, and/or there is a problem with pressure monitoring system 130.

Figure 2:
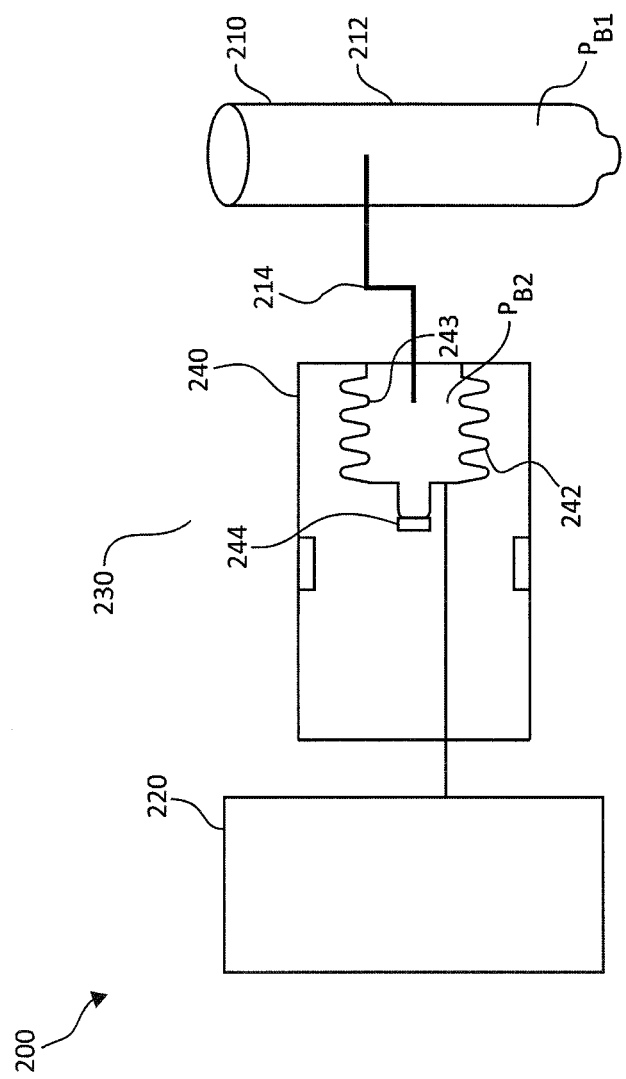
FIG. 2 is a schematic illustrating portions of a fire suppression system including a pressuring monitoring system comprising a various rate bellows, in accordance with various embodiments.

In various embodiments and with reference to FIG. 2, the fire suppression system 200 may comprise a bellows 240 with a variable spring rate. Bellows 240 may omit the need for a reference chamber, as discussed with reference to FIG. 1. Bellows 240 may be designed to correspond to the pressure and temperature relationship of the fire suppression agent and corresponding pressure $P_{B1}$ of bottle 210. In this regard, convolutions 243 (e.g., interior and/or exterior convolutions) may be configured to vary and/or approximate pressure $P_{B1}$ and/or $P_{B2}$. In response to a pressure leak and/or fire suppression agent leak in bottle 210 and/or bottle volume 212, bellows 240 may indicate a change in $P_{B2}$ by expanding or contracting causing mating contact 244 to indicate a leak. The expanding or contracting of bellows 240 may result in an closed circuit, indicating proper pressure $P_{B1}$ and/or $P_{B2}$ and/or fire suppression agent fill of bottle 210 and/or bottle volume 212. Moreover, where pressure $P_{B2}$ and/or fire suppression agent is low resulting in an open circuit, controller 220 may be configured to indicate that there is a problem with fire suppression system 200, bottle 210, bottle volume 212 and/or pressure monitoring system 230.

In various embodiments, the configuration of bellows 240, body 242, convolutions 243, and/or pressures $P_{B1}$ and/or $P_{B2}$ may be such that an open circuit created by matting contact 244 indicates bottle 210 and/or bottle volume 212 contains proper pressure and/or fire suppression agent. Moreover, in this configuration a closed circuit created by matting contact 244 may be an indication that bottle 210 and/or bottle volume 212 has leaked, that there is insufficient fire suppression agent in bottle 210, there is insufficient pressure in bottle 210, and/or a problem with pressure monitoring system 230.

In various embodiments the fire suppression systems, controllers, bellow's pressure monitoring systems, and/or bottles described herein may be used with and/or retrofitted to any suitable civilian or military aircraft, vehicle and/or vessel that may be configured with a fire extinguishing/suppression system. Moreover the fire suppression systems described herein and, more specifically, the bellows pressure monitoring system described herein may more efficiently monitor the pressure of the fire suppression agent used in the various fire suppression systems.

In various embodiments, the fire extinguishing/suppression systems, controllers, bellow's pressure monitoring systems, and/or bottles described herein may be deployed in any suitable structure. For example, the fire extinguishing/suppression systems described herein may be deployed and/or used in cargo bays, engine nacelles, in auxiliary power unit bays, as part of any suitable fire protection system in an aircraft, structure, vessel and/or vehicle.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A fire suppression system, comprising:
   a bottle; and
   a pressure monitoring system including a bellows in fluid communication with the volume defined by the bottle, wherein an interior surface of the bellows is loaded by a bottle pressure, the bottle pressure being contained by the bottle and the bellows; and
   a controller configured to monitor the bellows, wherein the pressure monitoring system is configured to indicate at least one of an open circuit and a closed circuit to the controller in response to the bellows engaging a mating contact.

2. The fire suppression system of claim 1, wherein the bellows have a linear spring rate.

3. The fire suppression system of claim 2, further comprising a reference chamber that is pressurized to a reference pressure.

4. The fire suppression system of claim 3, wherein the reference pressure is configured to load an exterior surface of the bellows.

5. The fire suppression system of claim 1, wherein the bottle pressure is greater than the reference pressure.

6. The fire suppression system of claim 5, wherein the bellows is configured to compress in response to the bottle leaking.

7. The fire suppression system of claim 1, wherein the indication of the open circuit is indicative of a leak of a fire suppression agent from the bottle.

8. The fire suppression system of claim 1, wherein the bellows hermetically seals the bottle.

9. The fire suppression system of claim 1, wherein the pressure monitoring system is configured to indicate the open circuit in response to the bellows expanding.

10. A pressure monitoring system, comprising:
    a bellows having a first surface and a second surface,
    the first surface being an interior surface of the bellows and the second surface being an exterior surface of the bellows,
    the first surface configured to be loaded by a first pressure from a fire suppression system, the fire suppression system including a bottle;
    a reference chamber configured to maintain a reference pressure, wherein the reference pressure is configured to load the second surface, the reference chamber being in removable contact with the bellows and the bellows providing a hermetic seal between the bottle and the reference chamber, wherein
    the bellows is configured to engage a mating contact to indicate at least one of an open circuit and a closed circuit.

11. The pressure monitoring system of claim 10, wherein the first pressure is greater than the reference pressure in a normal condition.

12. The pressure monitoring system of claim 10, wherein the bellows is operatively coupled to a controller.

13. The pressure monitoring system of claim 12, wherein the bellows is configured to indicate the open circuit in response to a leak in the fire suppression system.

14. The pressure monitoring system of claim 10, wherein the bellow is configured to engage the mating contact to indicate the closed circuit.

15. The pressure monitoring system of claim 14, wherein the bellows is configured to engage the mating contact in response to the bellows expanding.

* * * * *